United States Patent
Johnson et al.

(10) Patent No.: US 6,302,943 B1
(45) Date of Patent: Oct. 16, 2001

(54) OPTIMUM ADSORBENTS FOR $H_2$ RECOVERY BY PRESSURE AND VACUUM SWING ABSORPTION

(75) Inventors: Leighta Maureen Johnson, Allentown; Thomas Stephen Farris, Bethlehem; Timothy Christopher Golden, Allentown; Edward Landis Weist, Jr., Macungie; James Michael Occhialini, New Tripoloi, all of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/432,517

(22) Filed: Nov. 2, 1999

(51) Int. Cl.⁷ ................................................ B01D 53/047
(52) U.S. Cl. ........................ 95/96; 95/130; 95/140; 95/902
(58) Field of Search ........................ 95/96–98, 100–106, 95/130, 140, 902

(56) References Cited

U.S. PATENT DOCUMENTS

| | | |
|---|---|---|
| 3,176,444 | 4/1965 | Kiyonaga . |
| 3,221,476 * | 12/1965 | Meyer ................................ 95/140 X |
| 3,282,028 * | 11/1966 | Berlin ................................. 95/140 X |
| 3,430,418 | 3/1969 | Wagner . |
| 3,564,816 | 2/1971 | Batta . |
| 3,986,849 | 10/1976 | Fuderer et al. ......................... 55/25 |
| 4,477,267 | 10/1984 | Reiss ..................................... 55/68 |
| 4,813,980 | 3/1989 | Sircar ..................................... 55/26 |
| 4,859,217 | 8/1989 | Chao ....................................... 55/68 |
| 4,861,351 * | 8/1989 | Nicholas et al. ................... 95/140 X |
| 4,964,888 * | 10/1990 | Miller ................................. 95/140 X |
| 5,152,813 | 10/1992 | Coe et al. ............................... 55/26 |
| 5,174,979 | 12/1992 | Chao et al. ........................... 423/715 |
| 5,354,360 | 10/1994 | Coe et al. ............................... 95/101 |
| 5,441,557 | 8/1995 | Mullhaupt et al. ..................... 95/95 |
| 5,885,331 * | 3/1999 | Reiss et al. ......................... 95/130 X |
| 5,912,422 | 6/1999 | Bomard et al. ......................... 95/96 |
| 5,914,455 * | 6/1999 | Jain et al. ........................... 95/140 X |
| 5,922,107 * | 7/1999 | Labasque et al. ................... 95/130 X |
| 6,036,939 * | 3/2000 | Funakoshi et al. ................. 95/130 X |
| 6,083,301 * | 7/2000 | Gary et al. .......................... 95/140 X |
| 6,143,057 * | 11/2000 | Bülow et al. ....................... 95/130 X |
| 6,152,991 * | 11/2000 | Ackley ............................... 95/130 X |
| 6,156,101 * | 12/2000 | Naheiri .............................. 95/130 X |

FOREIGN PATENT DOCUMENTS

| | | |
|---|---|---|
| 0855209 | 7/1998 | (EP) . |
| WO 97/45363 | 12/1997 | (WO) . |

\* cited by examiner

*Primary Examiner*—Robert H. Spitzer
(74) *Attorney, Agent, or Firm*—Geoffrey L. Chase

(57) ABSTRACT

An improved adsorption process is provided for purifying hydrogen from a feed gas mixture including hydrogen and at least one impurity selected from the group consisting of carbon monoxide and nitrogen. The process includes providing an adsorption apparatus having a discharge end adsorption layer containing an adsorbent with a Henry's law constant ($K_H$) at 70° F. for the impurity from about 0.5 to about 2.4 mmole/g/atm. The product gas collected from the adsorption apparatus is high purity (99.99+%) hydrogen.

29 Claims, 2 Drawing Sheets

US 6,302,943 B1

OPTIMUM ADSORBENTS FOR $H_2$ RECOVERY BY PRESSURE AND VACUUM SWING ABSORPTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to adsorption processes, and more particularly to hydrogen production via pressure swing adsorption (PSA) and vacuum swing adsorption processes.

Hydrogen production via pressure swing adsorption ($H_2$ PSA) is a multi-million dollar industry supplying high purity hydrogen for chemical producing industries, metals refining and other related industries. Typical commercial sources for the production of hydrogen are the reforming of natural gas or partial oxidation of various hydrocarbons. Other hydrogen-rich gas sources which can be upgraded by PSA technology to a high purity product include refinery off-gases with $C_1$–$C_{10}$ hydrocarbon contaminants. See, e.g., U.S. Pat. No. 3,176,444 to Kiyonaga. The reforming is carried out by reacting the hydrocarbon with steam and/or with oxygen-containing gas (e.g., air or oxygen-enriched air), producing a hydrogen gas stream containing accompanying amounts of oxides of carbon, water, residual methane and nitrogen. Unless it is desired to recover carbon monoxide, the carbon monoxide is customarily converted to carbon dioxide by water gas shift reaction to maximize the hydrogen content in the stream. Typically, this gas stream is then sent to a PSA system.

In a typical PSA system, a multicomponent gas is passed to at least one of multiple adsorption beds at an elevated pressure to adsorb at least one strongly sorbed component while at least one component passes through. In the case of $H_2$ PSA, $H_2$ is the most weakly adsorbed component which passes through the bed. At a defined time, the feed step is discontinued and the adsorption bed is depressurized in one or more concurrent steps which permits essentially pure $H_2$ product to exit the bed with a high recovery of the most weakly adsorbed component, $H_2$. Then a countercurrent desorption step is carried out, followed by countercurrent purge and repressurization.

The cost of hydrogen from integrated reformer/PSA systems is impacted by both the capital and operating costs of the system. Clearly, economic production of hydrogen requires minimization of operating and capital costs. Capital cost is most widely affected by the size of the reformer and the size of the PSA beds. PSA bed size decreases as the feed loading (lb-moles of feed gas processed/bed volume) of the PSA increases. Feed loading can be increased by either improved process cycles or improved adsorbents. The size of the reformer is impacted mostly by the hydrogen recovery of the PSA. Improvements in hydrogen recovery in the PSA result in smaller reformer size (the reformer does not need to produce as much hydrogen because of better recovery in the PSA). Improvements in hydrogen recovery also lead to a reduced demand for reformer feed gas, i.e., natural gas, which constitutes the largest operating cost of the reformer. Hydrogen recovery in the PSA can also be improved by either improved process cycles or improved adsorbents.

$H_2$ PSA process performance (on-line time, feed loading, product purity, recovery) is usually dictated by the second most weakly adsorbing component in the $H_2$-rich stream. A bed can stay on feed, producing pure $H_2$, only until the level of impurity breakthrough reaches the desired product purity. For steam/methane reformer (SMR) cases, the PSA feed gas composition is typically about 1% $N_2$, 5% $CH_4$, 5% CO, 18% $CO_2$ and the remainder $H_2$. To produce high purity $H_2$ (99.99+%) with this feed gas composition, $N_2$ is the key breakthrough component since it is the most weakly adsorbing feed gas component besides $H_2$. Since $N_2$ is the key breakthrough component, it has been common to place a zeolite adsorbent with high capacity for $N_2$ at the product end of the bed. In some cases, the $H_2$ purity spec is 99.9% with less than 10 ppm CO in the product $H_2$. In these cases, the plant becomes CO-controlling and zeolites are the prior art adsorbents for CO removal from $H_2$.

For example, U.S. Pat. No. 3,430,418 to Wagner teaches a layered adsorption zone with the inlet material comprising activated carbon and the discharge end containing zeolite for the removing the minor component of $N_2$, CO or $CH_4$. U.S. Pat. No. 3,564,816 to Batta exemplifies the use of CaA (5A) zeolite as an adsorbent for PSA processing. U.S. Pat. No. 3,986,849 to Fuderer et al. discloses a layered bed adsorption zone with activated carbon at the feed end of the bed and CaA zeolite at the discharge end.

The art teaches a variety of means for removing CO and/or $N_2$ from gas mixtures. In particular, Li containing X and Ca containing A type zeolites have been widely employed as adsorbents for separating $N_2$ or CO from more weakly adsorbing gas mixtures. See, e.g., U.S. Pat. Nos. 4,813,980, 4,859,217, 5,152,813, 5,174,979, 5,354,360 and 5,441,557, 5,912,422, EP 0 855 209 and WO 97/45363.

Despite the foregoing developments and their asserted advantages, there is still room for improvement in the art.

Thus, it is desired to provide an improved method for recovering purified hydrogen in CO and/or $N_2$ controlled $H_2$ PSA. It is also desired to provide improved adsorbents and systems for use in the improved method.

It is further desired to provide an improved CO coldbox offgas purification method. It is also desired to provide improved adsorbents and systems for use in the improved method.

All references cited herein are incorporated herein by reference in their entireties.

BRIEF SUMMARY OF THE INVENTION

The invention provides an adsorption process to purify hydrogen from a feed gas mixture including hydrogen and at least one impurity selected from the group consisting of carbon monoxide and nitrogen, said process comprising:

provided an adsorption apparatus comprising a discharge end adsorption layer comprising an adsorbent having a $K_h$ at 70° F. for said impurity from 0.85 to 1.40 mmole/g/atm;

feeding through said adsorption apparatus said feed gas mixture; and collecting a product gas from said adsorption apparatus, wherein said product gas consists essentially of hydrogen.

The invention further provides an adsorption process to purify hydrogen from a feed gas mixture including hydrogen and nitrogen, said process comprising:

selecting at least one adsorbent based on said at least one adsorbent having a $K_H$ at 70° F. for nitrogen of 0.55 to 1.40 mmole/g/atm;

providing an adsorption apparatus comprising a discharge end adsorption layer comprising said at least one adsorbent;

feeding through said adsorption apparatus said feed gas mixture; and collecting a product gas from said adsorption apparatus, wherein said product gas consists essentially of hydrogen.

Still further provided is an adsorption process to purify hydrogen from a feed gas mixture including hydrogen and carbon monoxide, said process comprising:

providing an adsorption apparatus comprising a discharge end adsorption layer comprising an adsorbent having a $K_H$ at 70° F. for carbon monoxide from 0.8 to 2.2 mmole/g/atm;

feeding through said adsorption apparatus said feed gas mixture; and collecting a product gas from said adsorption apparatus, wherein said product gas consists essentially of hydrogen.

Apparatuses to perform the process of the invention are also provided.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
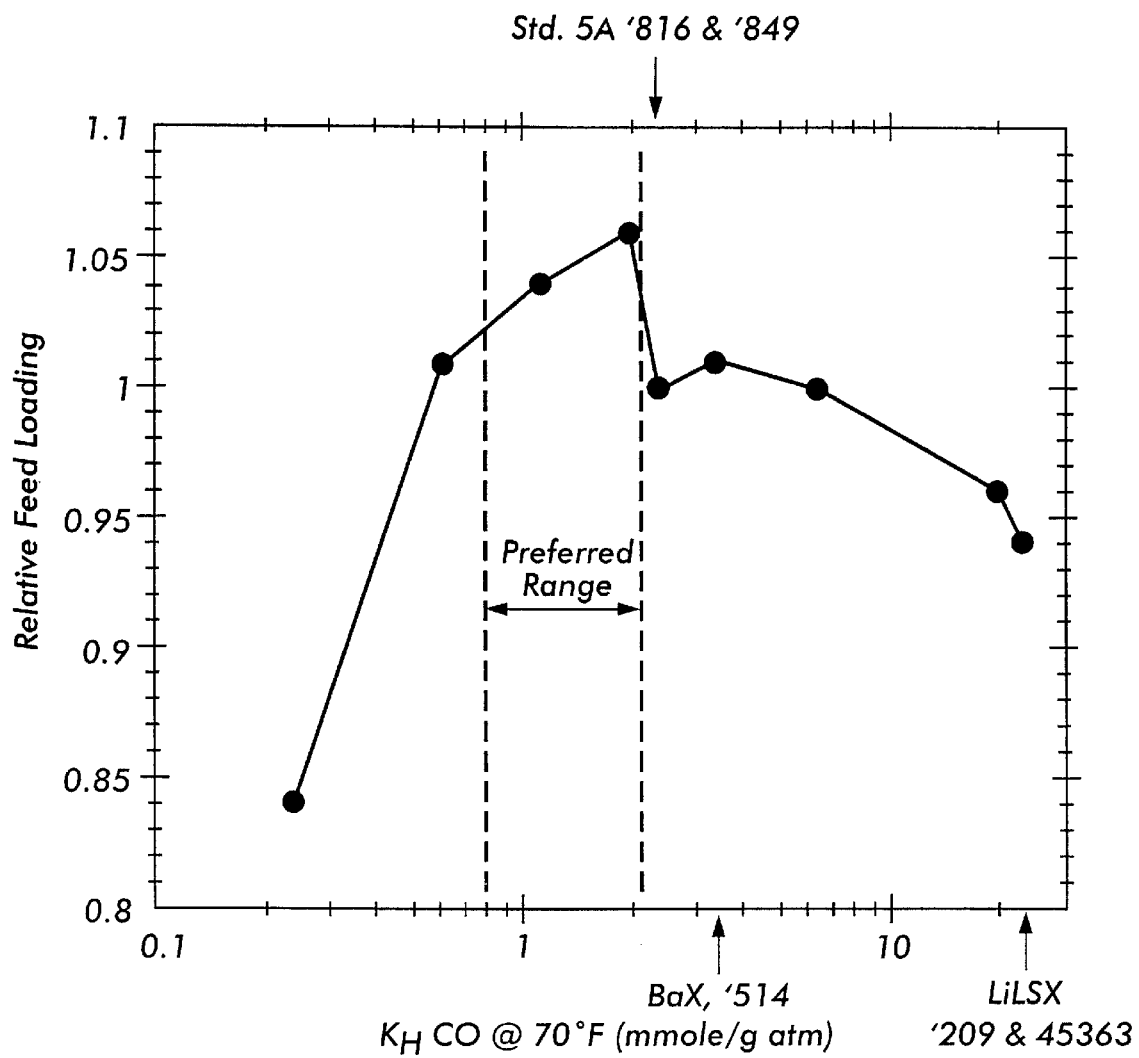
FIG. 1 is a plot of relative feed loading versus $K_H$ CO.

The inventors have discovered that conventional separation methods employing conventional adsorbents in conventional devices can be significantly improved by providing adsorbents having Henry's law constants ($K_H$) within predetermined ranges. The Henry's law constant for an adsorption isotherm is defined as the initial isotherm slope. See, for example, "Physical Adsorption of Gases," D. M. Young and A. D. Crowell, p. 104, (Butterworths, London 1962). The units of the constant are in amount of gas adsorbed per unit weight of adsorbent per unit of pressure (e.g., mole of gas adsorbed/gram of adsorbent/atmosphere of pressure).

The invention provides an improved PSA process for the purification of $H_2$ containing gas streams, wherein the minor impurity which dictates $H_2$ purity comprises at least one of $N_2$ and CO. At least the final adsorbent layer for the process comprises an adsorbent having a $K_H$ at 70° F. for the minor impurity from 0.85 to 1.40 millimole of impurity/gram of adsorbent/atmosphere of impurity pressure (or simply mmole/g/atm).

In $N_2$ controlling embodiments, at least the final adsorbent layer comprises a material having a Henry's law constant at 70° F. (21.1° C.) for $N_2$ between 0.55 and 1.40 mmole/g/atm, preferably from 0.55 to 0.83 mmole/g/atm and from 0.85 to 1.40 mmole/g/atm. In embodiments, $K_H$ $N_2$ is at least 0.90 mmole/g/atm or at least 1.00 mmole/g/atm.

In CO controlling embodiments, at least the final adsorbent layer comprises a material having a Henry's law constant at 70° F. (21.1° C.) for CO between 0.8 and 2.2 millimole of CO/gram of adsorbent/atmosphere of CO pressure, preferably from 1 to 2 mmole/g/atm, even more preferably, at least 1.5 mmole/g/atm.

The feed temperature is preferably 32 to 140° F. (0 to 60 °C.). The feed pressure is preferably from 100 to 1000 psig. Employing an adsorbent according to the invention under these conditions maximizes the feed loading and recovery of the PSA process over other adsorbents tested. The bulk density is preferably from 30 to 60 lbs/ft$^3$. The particle diameter is preferably from 0.5 to 3 mm.

The final $H_2$ purity is preferably at least 99.9%, more preferably at least 99.99%, even more preferably at least 99.999%, and most preferably at least 99.9999%.

The apparatus of the invention preferably comprises an inlet end adsorption layer comprising activated carbon, activated alumina, silica gel or combinations thereof, in addition to the discharge end adsorption layer comprising an adsorbent of the invention. It is preferred that the discharge end adsorption layer consist essentially of the adsorbent of the invention. In embodiments, all adsorption layers of the adsorption apparatus consist essentially of an adsorbent of the invention.

For CO controlling processes, the adsorbent is preferably selected from the group consisting of NaX (or 13X) both with and without binder, NaA (or 4A) both with and without binder and potassium exchanged chabazite both with and without binder.

For $N_2$ controlling processes, the adsorbent is preferably selected from the group consisting of CaA (5A) exchanged to greater than 80% calcium levels both with and without binder, sodium exchanged chabazite both with and without binder.

$H_2$ recovery in accordance with the invention is higher than that of prior art processes wherein the discharge end adsorption layer is substantially devoid of adsorbents of the invention. Preferably, $H_2$ recovery is at least 75% for both $N_2$ controlling processes and CO controlling processes.

The invention is suitable for $N_2$ controlling processes wherein the feed gas comprises hydrogen and 0.1 to 20% nitrogen, and for CO controlling processes wherein the feed gas comprises hydrogen and 0.1 to 40% carbon monoxide.

It will be appreciated by those skilled in the art that the invention additionally facilitates the removal of CO and/or $N_2$ from gas streams other than $H_2$ gas streams, such as, e.g., He gas streams, etc, and the removal of impurities from gas streams by vacuum swing adsorption processes as well as pressure swing adsorption processes.

The invention will be illustrated in more detail with reference to the following Examples, but it should be understood that the present invention is not deemed to be limited thereto.

EXAMPLE 1

A process development unit (PDU) was used to measure $H_2$ PSA performance for a feed gas composition comprising: 10.5% $CO_2$, 0.2% $N_2$, 5.6% $CH_4$, 3.9% CO and 79.8% $H_2$. The feed pressure was 400 psig and temperature 70° F. The beds were filled with 50% activated carbon and 50% zeolite. Using a 5 bed PSA cycle with 3 equalizations, different zeolite adsorbents were screened for process performance. The results of the experiments for the adsorbents tested for a $H_2$ product with 11 ppm CO were as follows:

| Adsorbent | $K_H$ CO @ 70° F. (mmole/g/atm) | Relative $H_2$ Recovery (%) | Relative Feed Loading |
|---|---|---|---|
| Standard 5A | 2.412 | — | 1.00 |
| Binderless 13X | 2.036 | +0.5 | 1.09 |

This shows that the $H_2$ recovery decreases with increasing $K_H$ CO. The binderless 13X gives both a higher recovery and higher feed loading than Standard 5A (Union Carbide Data Sheet F-2184B, "Linde Molecular Sieve Type 5A"). It is not obvious that standard 5A, with a higher equilibrium capacity for CO at a given pressure, would not perform as well as the lower CO capacity binderless 1 3X in a $H_2$ PSA process. In fact, the prior art teaches away from the instant invention in extolling the advantages, of using adsorbents that happen to have a higher $K_H$ CO for $H_2$ purification, such as LiLSX ($K_H$ CO of 23.37 mmole/g/atm @ 70° F.) (WO 97/145363).

EXAMPLE 2

An adsorption process simulator was used to estimate $H_2$ PSA performance for a feed gas composition of 10.5% $CO_2$, 0.2% $N_2$, 5.6% $CH_4$, 3.9% CO and 79.8% $H_2$. The feed pressure was 400 psig and temperature 70° F. The beds were filled with 50% activated carbon and 50% zeolite. Using a 5 bed PSA cycle with 3 countercurrent equalizations, different zeolite adsorbents were screened for process performance. All process simulator input parameters other than equilibrium parameters (e.g., density, mass transfer, void fraction) were the same as those used for standard 5A to ensure the results correlate only with differences in equilibrium isotherm parameters between adsorbents. The results of the simulations for adsorbents with a range of $K_H$ CO for a $H_2$ product with 11 ppm CO were as follows:

| Adsorbent | $K_H$ CO @ 70° F. (mmole/g/atm) | Relative Feed Loading |
|---|---|---|
| LiLSX | 23.37 | 0.94 |
| High Performance 5A Binderless, >90% Ca | 6.339 | 1.00 |
| Standard 5A | 2.412 | 1.00 |
| Binderless 13X | 2.036 | 1.06 |
| Standard 13X | 1.155 | 1.04 |
| Activated Carbon | 0.620 | 1.01 |
| HY | 0.239 | 0.84 |

The results of the simulations for standard 5A and binderless 13X show the same trend as the $H_2$ PDU results, even though the isotherm parameters were the only adsorbent specific parameters used in the simulation. The prior art adsorbent with the larger $K_H$ CO, standard 5A, has an inferior relative feed loading to binderless 13X for a CO controlled $H_2$ PSA process. The process simulation was repeated for adsorbents with a wide range of $K_H$ CO. FIG. 1 shows a plot of the relative feed loading versus $K_H$ CO from these simulations. Feed loading increases as the $K_H$ CO increases to about 2.0 mmole/g/atm, creating a non-obvious maximum in performance, after which further increases in the $K_H$ CO yield lower feed loading. This result is contrary to what would be expected from the prior art, which recommends adsorbents for CO controlled $H_2$ PSA having $K_H$ COs in excess of 2.2 mmole/g/atm, such as Standard 5A (see, e.g., U.S. Pat. Nos. 3,564,816 and 3,986,849), CaX (see, e.g., U.S. Pat. No. 4,477,267) and LiLSX (see, e.g., EP 0 855 209 and WO 97/45363). The results of these simulations show that there is both a preferred minimum value as well as a preferred maximum value for the $K_H$ CO where performance begins to degrade.

EXAMPLE 3

An adsorption process simulator was used to estimate $H_2$ PSA performance for a feed gas composition of 0.11% $CO_2$, 0.10% $N_2$, 1.34% $CH_4$, 0.5% CO and 97.95% $H_2$. The feed pressure was 325 psig and temperature 100° F. Using a 6 bed PSA cycle, binderless 13X and standard 5A zeolite adsorbents were screened for process performance. The activated carbon and zeolite bed splits were optimized for each zeolite. The actual measured process simulator input parameters (density, mass transfer, void fraction) were used for the adsorbents in this simulation. The results of the simulations for a $H_2$ product with 1 ppm CO were as follows:

| Adsorbent | $K_H$ CO @ 70° F. (mmole/g/atm) | Relative $H_2$ Recovery (%) | Relative Feed Loading |
|---|---|---|---|
| Standard 5A | 2.412 | — | 1.00 |
| Binderless 13X | 2.036 | +0.5 | 1.09 |

This example clearly shows that the advantages of the invention are maintained when the bed splits are optimized for each adsorbent and the effects of differences in process simulator input parameters between adsorbents are included. This example also shows that the improved performance of binderless 13X over standard 5A extends to a CO cold box effluent type gas stream in addition to a standard SMR stream as shown in Example 1.

EXAMPLE 4

A process development unit (PDU) was used to measure $H_2$ performance for a feed gas composition of 14.2% $CO_2$, 5.5% $N_2$, 4.5% $CH_4$, 3.0% CO and 72.8% $H_2$. The feed pressure was 446 psig and temperature 70° F. The beds were filled with 60% activated carbon and 40% zeolite. Using a 5 bed PSA cycle with 3 equalizations, different zeolite adsorbents were screened for process performance. The results of the experiments for adsorbents tested for a $H_2$ product with 500 ppm $N_2$ were as follows:

| Adsorbent | $K_H$ $N_2$ @ 70° F. (mmole/g/atm) | Relative $H_2$ Recovery (%) | Relative Feed Loading |
|---|---|---|---|
| >80% CaX | 5.256 | −0.4 | 0.94 |
| High Performance 5A Binderless, >90% Ca | 0.844 | +0.7 | 1.08 |
| Standard 5A | 0.429 | — | 1.00 |

Figure 2:
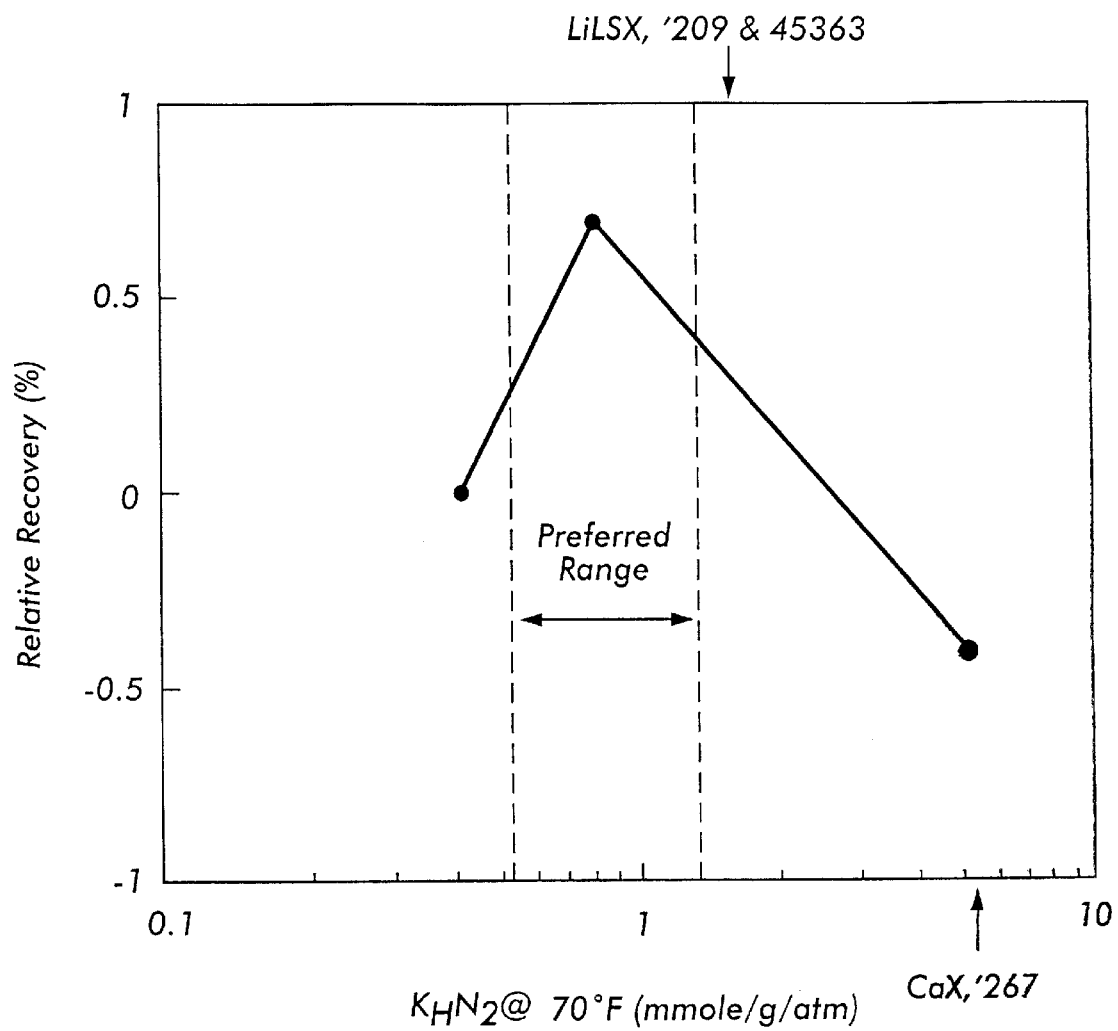
FIG. 2 is a plot of relative recovery versus $K_H$ $N_2$.

FIG. 2 is a plot of the PDU relative $H_2$ recovery versus $K_H$ $N_2$ for CaX, high performance 5A and standard 5A. A non-obvious maximum in feed loading is observed at a $K_H$ $N_2$ of 0.8 mmole/g/atm. The prior art teaches away from the instant invention in extolling the advantages of using adsorbents for $H_2$ purification that happen to have lower $K_H$ $N_2$, such as standard 5A (see, e.g., U.S. Pat. Nos. 3,564,816 and 3,986,849) or higher $K_H$ $N_2$, such as LiLSX (see, e.g., EP 0 855 209 and WO 97/45363), which has a $K_H$ $N_2$ of 1.710 mmole/g/atm and CaX (see, e.g., U.S. Pat. No. 4,477,267) which has a $K_H$ $N_2$ of 5.256 mmole/g/atm. The PDU tests show that there is an intermediate range of values for the $K_H$ $N_2$ where performance is unexpectedly enhanced.

EXAMPLE 5

An adsorption process simulator was used to estimate $H_2$ PSA performance for a feed gas composition of 10.5% $CO_2$, 0.2% $N_2$, 5.6% $CH_4$, 3.9% CO and 79.8% $H_2$. The feed pressure was 400 psig and temperature 70° F. The beds were filled with 50% activated carbon and 50% zeolite. Using a 5 bed PSA cycle with 3 equalizations, different adsorbents were screened for process performance. All process simulator input parameters (density, mass transfer, void fraction) were the same as those used for standard 5A to ensure the results correlate only with differences in equilibrium isotherm parameters between adsorbents. The results of the simulations for adsorbents with a range of $K_H$ $N_2$ for a $H_2$ product with 100 ppm $N_2$ were as follows:

| Adsorbent | $K_H$ $N_2$ @ 70° F. (mmole/g/atm) | Relative $H_2$ Recovery (%) |
| --- | --- | --- |
| Binderless > 80% CaX | 6.080 | −0.3 |
| LiLSX | 1.710 | +0.3 |
| High Performance 5A Binderless, >90% Ca | 0.844 | +0.6 |
| Standard 5A | 0.429 | — |
| Standard 13X | 0.306 | −0.8 |

These process simulations, as in the case for CO, allow an optimum range of $K_H$ $N_2$, providing superior $H_2$ PSA performance to be defined. The maximum occurs at a lower $K_H$ $N_2$ value than both binderless CaX ($K_H$ $N_2$ of 6.080 mmole/g/atm @ 70° F.) and LiLSX ($K_H$ $N_2$ of 1.710 mmole/g/atm @ 70° F.) which are taught in the prior art. The minimum occurs at a higher $K_H$ $N_2$ value than standard 5A which is taught in the prior art. Both the simulation and PDU results support the definition of an optimum range of $K_H$ $N_2$ values which provide superior performance for $H_2$ PSA processes that is not inclusive of the prior art adsorbents.

The preceding examples clearly demonstrate that there is an optimum range of adsorbent $K_H$ for achieving the best performance in both $N_2$ and CO impurity controlled $H_2$ adsorption processes.

While the invention has been described in detail and with reference to specific examples thereof, it will be apparent to one skilled in the art that various changes and modifications can be made therein without departing from the spirit and scope thereof.

What is claimed is:

1. An adsorption process to purify hydrogen from a feed gas mixture including hydrogen and at least one impurity selected from the group consisting of carbon monoxide and nitrogen, said process comprising:

providing an adsorption apparatus comprising a discharge end adsorption layer comprising an adsorbent having a $K_H$ at 70° F. for said impurity from 0.85 to 1.40 mmole/g/atm;

feeding through said adsorption apparatus said feed gas mixture; and collecting a product gas from said adsorption apparatus, wherein said product gas consists essentially of hydrogen.

2. An adsorption process to purify hydrogen from a feed gas mixture including hydrogen and carbon monoxide, said process comprising:

providing an adsorption apparatus comprising a discharge end adsorption layer comprising an adsorbent having a $K_H$ at 70° F. for carbon monoxide from 0.8 to 2.2 mmole/g/atm;

feeding through said adsorption apparatus said feed gas mixture; and collecting a product gas from said adsorption apparatus, wherein said product gas consists essentially of hydrogen.

3. The process of claim 2, wherein said adsorbent is selected based on having said $K_H$ value.

4. The process of claim 2, wherein a feed temperature is 32 to 140° F.(0 to 60° C.) and a feed pressure is 100 to 1000 psig.

5. The process of claim 2, wherein said feed gas comprises hydrogen and 0.1 to 40% carbon monoxide.

6. The process of claim 2, wherein said adsorbent has a bulk density of 30 to 60 lbs/ft$^3$.

7. The process of claim 2, wherein said adsorbent has a particle diameter of 0.5 to 3 mm.

8. The process of claim 2, wherein said product gas comprises at least 99.9% $H_2$.

9. The process of claim 2, wherein $H_2$ recovery is enhanced relative to said process performed with a discharge end adsorption layer substantially devoid of said adsorbent.

10. The process of claim 2, wherein $H_2$ recovery is at least 75%.

11. The process of claim 2, wherein said discharge end adsorption layer consists essentially of said adsorbent.

12. The process of claim 11, wherein an inlet end adsorption layer of said adsorption apparatus consists essentially of activated carbon, activated alumina, silica gel and combinations thereof.

13. The process of claim 2, wherein all adsorption layers of said adsorption apparatus consist essentially of said adsorbent.

14. The process of claim 2, wherein said adsorbent is a member of the group consisting of sodium exchanged X zeolite with and without binder, sodium exchanged A zeolite with and without binder and potassium exchanged chabazite with and without binder.

15. An adsorption process to purify hydrogen from a feed gas mixture including hydrogen and nitrogen, said process comprising:

selecting at least one adsorbent based on said at least one adsorbent having a $K_H$ at 70° F. for nitrogen of 0.55 to 1.40 mmole/g/atm;

providing an adsorption apparatus comprising a discharge end adsorption layer comprising said at least one adsorbent;

feeding through said adsorption apparatus said feed gas mixture; and collecting a product gas from said adsorption apparatus, wherein said product gas consists essentially of hydrogen.

16. An adsorption process to purify hydrogen from a feed gas mixture including hydrogen and nitrogen, said process comprising:

providing an adsorption apparatus comprising a discharge end adsorption layer comprising an adsorbent having a $K_H$ at 70° F. for nitrogen from 0.55 to 0.83 mmole/g/atm or from 0.85 to 1.40 mmole/g/atm;

feeding through said adsorption apparatus said feed gas mixture; and collecting a product gas from said adsorption apparatus, wherein said product gas consists essentially of hydrogen.

17. The process of claim 16, wherein said adsorbent is selected based on having said $K_H$ value.

18. The process of claim 16, wherein a feed temperature is 32 to 140° F. (0 to 60° C.) and a feed pressure is 100 to 1000 psig.

19. The process of claim 16, wherein said feed gas comprises hydrogen and 0.1 to 20% nitrogen.

20. The process of claim 16, wherein said adsorbent has a $K_H$ at 70° F. for nitrogen of at least 0.9 mmole/g/atm.

21. The process of claim 16, wherein said adsorbent has a bulk density of 30 to 60 lbs/ft$^3$.

22. The process of claim 16, wherein said adsorbent has a particle diameter of 0.5 to 3 mm.

23. The process of claim 16, wherein said product gas comprises at least 95.0% $H_2$.

24. The process of claim 16, wherein $H_2$ recovery is enhanced relative to said process performed with a discharge end adsorption layer substantially devoid of said adsorbent.

25. The process of claim 16, wherein $H_2$ recovery is at least 75%.

26. The process of claim 16, wherein said discharge end adsorption layer consists essentially of said adsorbent.

27. The process of claim 26, wherein an inlet end adsorption layer of said adsorption apparatus consists essentially of activated carbon, activated alumina, silica gel and combinations thereof.

28. The process of claim 16, wherein all adsorption layers of said adsorption apparatus consist essentially of said adsorbent.

29. The process of claim 16, wherein said adsorbent is a member of the group consisting of greater than 80% calcium-exchanged A zeolite with binder, and sodium-exchanged chabazite with and without binder.

* * * * *